US012782660B2

(12) United States Patent
Meadowcroft et al.

(10) Patent No.: US 12,782,660 B2
(45) Date of Patent: Nov. 3, 2026

(54) APPARATUS AND METHOD FOR SUPPORTING OPTICAL ALIGNER

(71) Applicant: Avago Technologies International Sales Pte. Limited, Singapore (SG)

(72) Inventors: David Meadowcroft, Bury St Edmunds (GB); Near Margalit, Westlake Village, CA (US); Gary Fong Kem Goon, Singapore (SG); Hari Potluri, Milpitas, CA (US); Han Peng Goh, Singapore (SG); Sheng Zhang, Cupertino, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 281 days.

(21) Appl. No.: 18/631,684

(22) Filed: Apr. 10, 2024

(65) Prior Publication Data

US 2025/0164723 A1 May 22, 2025

Related U.S. Application Data

(60) Provisional application No. 63/600,161, filed on Nov. 17, 2023.

(51) Int. Cl.
*G02B 6/43* (2006.01)
*G02B 6/42* (2006.01)

(52) U.S. Cl.
CPC ............ *G02B 6/43* (2013.01); *G02B 6/4231* (2013.01); *G02B 6/4261* (2013.01); *G02B 6/4293* (2013.01)

(58) Field of Classification Search
None
See application file for complete search history.

(56) References Cited

U.S. PATENT DOCUMENTS

2012/0063729 A1 3/2012 Fujiwara et al.
2013/0156386 A1 6/2013 Miller
2014/0321821 A1 10/2014 Hsieh
2015/0341066 A1 11/2015 Hsieh
2020/0012056 A1 1/2020 Lian et al.
(Continued)

FOREIGN PATENT DOCUMENTS

WO 2023042471 A1 3/2023

OTHER PUBLICATIONS

European Patent Office, Extended Search Report, Application No. 24212583.9, Apr. 17, 2025, 10 pages.

*Primary Examiner* — Chad H Smith
(74) *Attorney, Agent, or Firm* — Quarles & Brady LLP

(57) ABSTRACT

An apparatus for supporting two fiber array unit (FAU) connectors in alignment with respective lenses of a photonics integrated circuit (PIC) includes a frame with a pair of arm sections joined with two side sections of a bottom section. The pair of arm sections is configured to parallelly insert in a package structure associated with a PIC chip to make the frame in a floating state. The bottom section provides a first support surface to support two aligners disposed respectively along the two side sections from top. Each aligner provides a semi-confined open space to receive a shelf extended out from a side edge of a PIC chip. The shelf is characterized by an alignment feature associated with a lens of the PIC chip. The semi-confined open space allows a body of a FAU connector to be loaded from top onto the shelf and be aligned with the lens based on the alignment feature.

10 Claims, 10 Drawing Sheets

(56) References Cited

U.S. PATENT DOCUMENTS

| | | | |
|---|---|---|---|
| 2020/0158969 | A1 | 5/2020 | Leigh et al. |
| 2022/0308294 | A1 | 9/2022 | Morgan et al. |
| 2022/0413240 | A1 | 12/2022 | Nekkanty et al. |
| 2023/0251428 | A1 | 8/2023 | Schaevitz et al. |
| 2023/0251442 | A1 | 8/2023 | Meadowcroft |

APPARATUS AND METHOD FOR SUPPORTING OPTICAL ALIGNER

CROSS-REFERENCES TO RELATED APPLICATIONS

This application claims priority to U.S. Patent Application No. 63/600,161, filed on Nov. 17, 2023, commonly assigned and incorporated by reference herein to its entirety for all purposes.

FIELD OF INVENTION

The present invention is directed to apparatus and method for supporting optical aligner in co-packaged optical system.

BACKGROUND OF THE INVENTION

As data rates in optical communication system increase, there is a strong trend to move the high-speed electrical signals of a transceiver closer the switch module. This leads to the development and implementation of so-called co-packaged optical (CPO) system by mounting transceiver optics next to silicon-based channel switches. As the technology advances, these co-packaged optics need to be miniaturized by applications of silicon photonics integrated circuits (SPIC) technology. SPIC need to have light inputs and outputs. The input on the transmitter side is continuous wave (CW) light which is then modulated and sent into the output. The input on the receiver side is modulated light which is then converted into electrical signals.

The existing technology for inputting and receiving light from a silicon photonics integrated circuit is to actively align a fiber block through pigtailing and to glue it in place using epoxy. The issue with pigtailing a fiber optic cable is that the structure can become very unwieldly and hard to manage, especially for a CPO with switch chip which can have many hundreds of fibers for the inputs/outputs. Also, CPO switch ICs often need to be attached to another substrate via ball-grid array (BGA) technology, which requires the structure to undergo solder reflow at high temperatures that may damage the fiber optics cable coatings. A pigtailed solution has one major problem that if one of the hundreds of fiber optic cables is accidentally broken the whole structure becomes useless and must be scrapped. This can be very costly. Therefore, it is desired to provide novel structure for supporting optical alignment placements of miniature optical connectors aligned with optical IOs of co-packaged optical system.

BRIEF DESCRIPTION OF THE DRAWINGS

A further understanding of the nature and advantages of particular embodiments may be realized by reference to the remaining sections of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF THE INVENTION

The present disclosure provides a structure for supporting alignment of a fiber array unit (FAU) connector with a photonic integrated circuit (PIC). The structure includes a frame with a pair of arm sections joined with two side sections of a bottom section. The pair of arm sections is configured to parallelly insert in a package structure associated with a PIC chip to make the frame in a floating state. The bottom section provides a first support surface to support two aligners disposed respectively along the two side sections from top. Each aligner provides a semi-confined open space to receive a shelf extended out from a side edge of a PIC chip. The shelf is characterized by an alignment feature associated with a lens of the PIC chip. The semi-confined open space allows a body of a FAU connector to be loaded from top onto the shelf and be aligned with the lens based on the alignment feature. There are additional embodiments as well.

Figure 1:
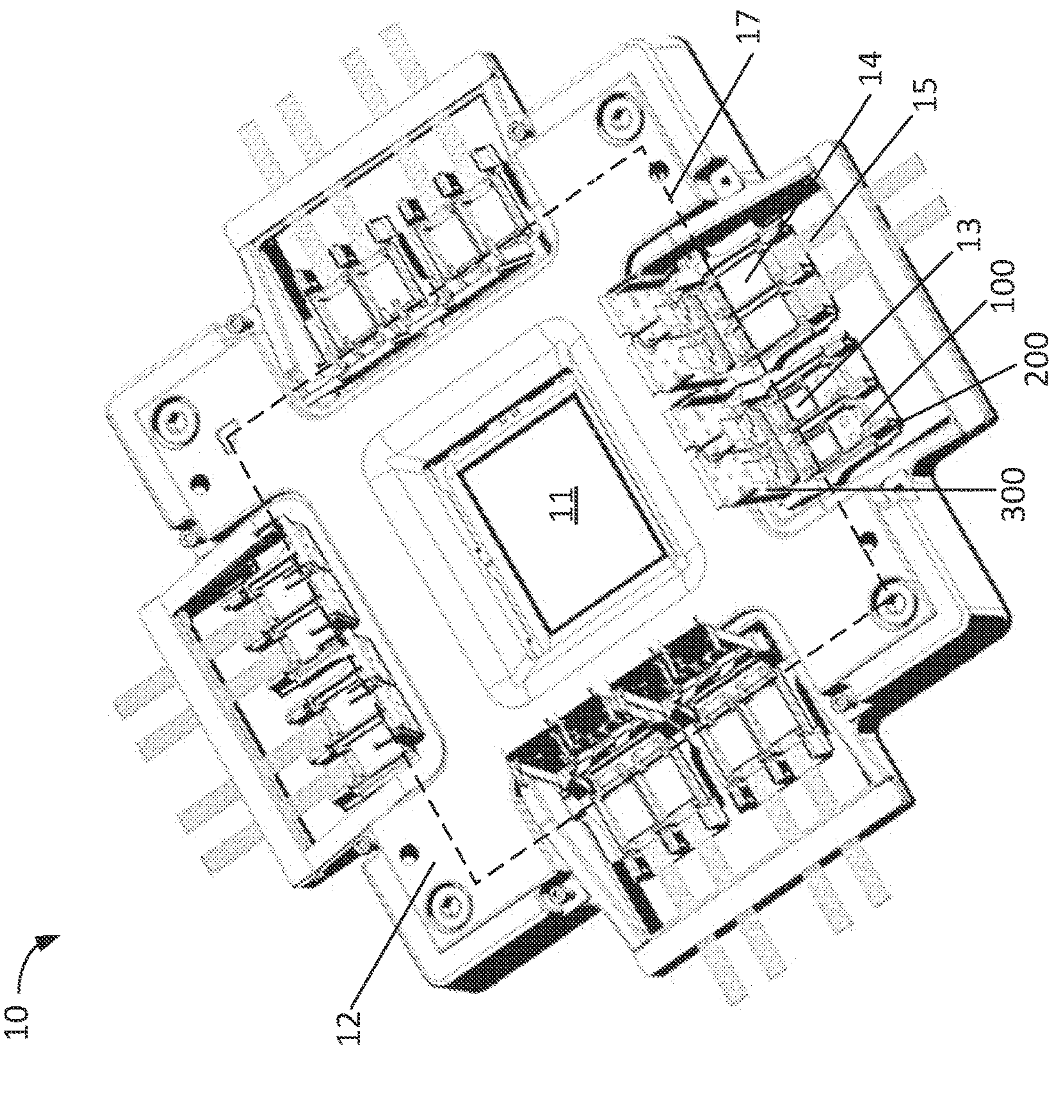
FIG. 1 is a perspective top view of the co-packaged optics photonic integrated circuits (CPO PIC) assembly with multiple fiber-array unit (FAU) connectors for optical inputs/outputs (IOs) according to an embodiment of the subject technology.

In an embodiment, the subject technology involves providing a solution of supporting alignment structure for an operator to insert and secure miniature optical fiber array unit (FAU) connectors with a co-packaged optics (CPO)-photonic integrated circuit (PIC) assembly. FIG. 1 shows a perspective top view of the CPO-PIC (10) assembly with maximum 16 FAU connectors (14) for optical Inputs/Outputs at four side edges of a PIC chip according to an embodiment of the subject technology. The CPO-PIC assembly (10) includes a package structure (12) fixed on a substrate where a switch module (11) is attached at center with optical Input/Output (IO) ports configured at respective four sides (indicated by the dashed line 17) of a PIC chip. The package structure (12) is configured to place an aligner (100) to allow each of the 16 FAU connectors (14) being disposed at each edge of the respective sides (17) of the PIC chip (not visible below the package structure (12) to establish light coupling with the IO ports of the CPO-PIC assembly (10). The FAU connector (14) comprises a small body followed by a ribbon fiber (15). The body of FAU connector (14) is made of glass, translucent, quite delicate, very hard to handle and locate to achieve secure alignment with the PIC chip. The alignment structure (100) is provided as a solid piece part of optical connector for the CPO-PIC assembly (10). In particularly, the aligner (100) makes it possible for an operator to place the body of the FAU connector 14 (e.g., by hand) into a position to establish micro-level alignments between a lens at front end of the body of the FAU connector 14 and a lens associated with the IO ports of the PIC chip. The PIC chip is also a very small size and delicate. In an embodiment, the PIC chip has a shelf (13) extended out from each IO port at the side edge of the PIC chip. The shelf (13) contains an alignment feature (not visible from FIG. 1) that is configured to assist the alignment between the lens at front end of the body of the FAU connector 14 and the lens associated with the IO ports of the PIC chip. The aligner (100) is configured to provide a cutout space to fit in the shelf (13) to allow the body of the FAU connector (14) to be attached onto the shelf and be secured at an alignment position using the alignment feature on the shelf (13).

The optical connector for the CPO-PIC assembly (10) also includes other piece parts to support the aligner (100). In an embodiment, the aligner (100) is configured to partially rest on a surface of the PIC chip and partially be supported by a bottom surface of a frame (200) which is attached to the package structure (12) in a floating state. The "floating state" is referred to herein as a physical state of the frame relative to its environment which provides a partial attachment at a side of the frame free of any direct bottom support. The frame (200) also provides a bottom section with support surfaces to support the shelf (13) in the floating state. The CPO-PIC assembly with multiple FAU connectors assisted by the aligner (100) must survive numerous quality tests including shock and vibration, unbiased damp heat, and fiber pulling tests. Throughout all these tests, the aligner (100) provided by the subject technology is configured to use a lid (300), which is coupled to the frame (200) via a pivotal pin to open or close, to apply a force from top to secure the body of FAU connector 14 to stay on the alignment position relative to the PIC chip and have minimal change in optical input/output power.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification, and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

When an element is referred to herein as being "connected" or "coupled" to another element, it is to be understood that the elements can be directly connected to the other element or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

When an element is referred to herein as being "disposed" in some manner relative to another element (e.g., disposed on, disposed between, disposed under, disposed adjacent to, or disposed in some other relative manner), it is to be understood that the elements can be directly disposed relative to the other element (e.g., disposed directly on another element), or have intervening elements present between the elements. In contrast, when an element is referred to as being "disposed directly" relative to another element, it should be understood that no intervening elements are present in the "direct" example. However, the existence of a direct disposition does not exclude other examples in which intervening elements may be present.

Similarly, when an element is referred to herein as being "bonded" to another element, it is to be understood that the elements can be directly bonded to the other element (without any intervening elements) or have intervening elements present between the bonded elements. In contrast, when an element is referred to as being "directly bonded" to another element, it should be understood that no intervening elements are present in the "direct" bond between the elements. However, the existence of direct bonding does not exclude other forms of bonding, in which intervening elements may be present. When a section or part of one piece of solid structure is referred to herein as being "joined" to another section or part of the same structure, it is to be understood that the section or part may be an undividable part of the one piece of solid structure just specifically named as to serve some unique functions comparing to other sections or parts. The one piece of solid structure may be machined or casted or 3D-printed as a whole piece. Alternatively, all sections or parts of the solid structure may be made (machined, casted, or printed) separately but connected as a single structure optionally by welding, soldering and blazing, mechanical fastening, adhesive bonding, press fitting, thermal bonding, or chemical bonding. The subject technology is focused to their functions individually or as a whole piece of the solid structure and should be applicable for any way of manufacturing.

Likewise, when an element is referred to herein as being a "layer," it is to be understood that the layer can be a single layer or include multiple layers. For example, a conductive layer may comprise multiple different conductive materials or multiple layers of different conductive materials, and a dielectric layer may comprise multiple dielectric materials or multiple layers of dielectric materials. When a layer is described as being coupled or connected to another layer, it is to be understood that the coupled or connected layers may include intervening elements present between the coupled or connected layers. In contrast, when a layer is referred to as being "directly" connected or coupled to another layer, it should be understood that no intervening elements are present between the layers. However, the existence of directly coupled or connected layers does not exclude other connections in which intervening elements may be present.

Moreover, the terms left, right, front, rear, top, bottom, forward, reverse, clockwise and counterclockwise are used for purposes of explanation only and are not limited to any fixed direction or orientation. Rather, they are used merely to indicate relative locations and/or directions between various parts of an object and/or components.

Furthermore, the methods and processes described herein may be described in a particular order for ease of description. However, it should be understood that, unless the context dictates otherwise, intervening processes may take place before and/or after any section of the described process, and further various procedures may be reordered, added, and/or omitted in accordance with various embodiments.

Unless otherwise indicated, all numbers used herein to express quantities, dimensions, and so forth should be understood as being modified in all instances by the term "about." In this application, the use of the singular includes the plural unless specifically stated otherwise, and use of the terms "and" and "or" means "and/or" unless otherwise indicated. Moreover, the use of the terms "including" and "having," as well as other forms, such as "includes," "included," "has," "have," and "had," should be considered non-exclusive. Also, terms such as "element" or "component" encompass both elements and components comprising one unit and elements and components that comprise more than one unit, unless specifically stated otherwise.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items. By way of example, the phrases "at least one of A, B, and C" or "at least one of A, B, or C" each refer to only A, only B, or only C; and/or any combination of A, B, and C. In instances where it is intended that a selection be of "at least one of each of A, B, and C," or alternatively, "at least one of A, at least one of B, and at least one of C," it is expressly described as such.

One general aspect of the subject technology includes a structure for supporting optical alignment pieces. The structure includes a frame may include multiple sections joined together to provide a first support surface for an aligner to be bonded to and a second support surface for a shelf to be bonded to. The aligner is configured to provide a semi-confined open space for receiving the shelf that may include an alignment feature associated with a second optical component, and to guide a body of a first optical component from top onto the shelf to align with the second optical component via the alignment feature. The multiple sections may include: a bottom section providing the first support surface with a front edge and the second support surface with a rear end; a pair of side sections spaced apart and respectively joined with two sides of the bottom section from the front edge to the rear end; two shoulder sections respectively having lower ends joined with the pair of side sections at the front edge in an upward angle; and a pair of arm sections respectively joined with upper ends of the two shoulder sections to extend an arm length forward in parallel with the pair of side sections. The pair of arm sections is configured to horizontally insert into a package structure of the second optical component to make the frame in a floating state.

Implementations may include one or more of the following features. The structure where the pair of arm sections may include cylinder shape with a taper end for facilitating the inserting respectively into two holes in the package structure of the second optical component. The pair of arm sections is configured to have one arm section fitted in one of the two holes in circular shape with an all-around gap smaller than 30 μm and have another arm section at the same time fitted in another one of the two holes in elliptical shape with a vertical gap smaller than 30 μm and a horizontal gap smaller than 120 μm. The two holes are spaced apart by a distance corresponding to a nominal spacing between the pair of the side sections that is configured to allow placements of two aligners in the frame respectively receiving two shelve associated with two second optical components. The bottom section may include multiple through-holes configured to dispense epoxy from underside of the frame to areas between the two aligners and the first support surface and between the two shelve and the second support surface. The structure may include two lids coupled to the frame via one pivotal pin inserted to two holes in respective two shoulder sections. Each lid is configured to be independently opened in an upright position revealing the aligner placed in the frame or closed down in a position covering the aligner. The frame further may include a rear section that may include two outer pillars respectively joined with the pair of side sections and a central pillar joined with the bottom section at middle point of the rear end of the first support surface. Each of the two outer pillars has a sloped outer side wall with an inward step configured to form a latch for locking respective one of the two lids at a closed position. The rear section is configured to provide two open channels between the central pillar and the two outer pillars for passing ribbon fibers respectively associated with two first optical components. The rear section is configured to provide a vertical gap between each of the two lids in the closed position and each pillar. The vertical gap is configured to limit the lid to over-travel 0.5 mm for unlocking from the closed position, where the lid may include a piece plate attached to underside of the lid in a tilted downward angle, the piece plate applying a limited force on the body of the first optical component to secure optical alignment when the lid is locked in the closed position. The pair of arm sections are characterized by a stiffness of supporting a force of at least 100 Newton applied to the rear section of the frame.

Another general aspect includes an apparatus for supporting two fiber array unit (FAU) connectors in alignment with respective lenses of a photonics integrated circuit (PIC). The apparatus also includes a frame with a pair of arm sections joined with two side sections of a bottom section, the pair of arm sections being configured to parallelly insert in a package structure associated with a PIC chip to make the frame in a floating state, the bottom section providing a first support surface to support two aligners disposed respectively along the two side sections from top, each aligner providing a semi-confined open space to receive a shelf extended out from a side edge of a PIC chip, the shelf being characterized by an alignment feature associated with a lens of the pic chip, the semi-confined space allowing a body of a FAU connector to be loaded from top onto the shelf and be aligned with the lens based on the alignment feature.

Implementations may include one or more of the following features. The apparatus where the bottom section is configured to provide a second support surface to support the two shelve respectively extended out from the side edge of the PIC chip. The bottom section may include multiple through-holes configured to dispense epoxy from underside of the frame to areas between the two aligners and the first support surface and between the two shelve and the second support surface. The frame further may include a rear section joined with the pair of side sections and the bottom section. The rear section may include two outer pillars and one central pillar providing two opened channels for passing ribbon fibers of the FAU connectors. Each of the two outer pillars may include a sloped outer side wall with an inward step configured to form a latch for locking a lid in a closed position covering the aligner that keeps a vertical gap between the lid in the closed position and top region of the pillars. The vertical gap is configured to limit the lid to over-travel 0.5 mm for unlocking from the closed position, where the lid may include a piece plate attached to underside of the lid in a downward angle, the piece plate pressing on the body of the FAU connector on the shelf aligned with the lens of the PIC chip. The frame further may include two shoulder sections configured to respectively connect the two side sections with the pair of arm sections in an upward angle to make the pair of arm sections positioned higher than and in parallel to the two side sections, the two shoulder sections may include two holes as pivot point for inserting a cylinder pin designed for supporting the lid rotated between an uptight open position and the closed position. The pair of arm sections are characterized by a stiffness of supporting at least 100 Newton force applied to the rear section of the frame. The pair of arm sections may include a cylinder shape with a taper end for facilitating insertion respectively into two holes in the package structure of the PIC chip. One of the pair of arm sections being fitted in one of the two holes with a nominal gap smaller than 30 um all-around. Another one of the pair of arm sections at the same time being fitted in another one of the two holes with a vertical gap smaller than 30 μm and a horizontal gap smaller than 120 um.

Yet another one general aspect includes a method for supporting alignment of fiber array unit (FAU) connectors with a photonics integrated circuit (PIC). The method also includes providing a frame with a bottom section joined with two side sections which further extend upward respectively to join with a pair of arm sections at a position higher than but in parallel to the two side sections. The method also includes inserting the pair or arm sections into two holes in a package structure of a PIC chip to make the frame in a floating state to provide one of support surfaces in the bottom section for supporting two shelve. The bottom section may include multiple through-holes configured to dispense epoxy for bonding the two shelve above. Each shelf is extended out beyond a corresponding lens at a side edge of the pic chip and characterized by an alignment feature associated with the lens. The method also includes placing two aligners in the frame. Each aligner has a front bar positioned on a surface of the pic chip while having a bottom positioned on another one of the support surfaces in the bottom section of the frame to be bonded by epoxy. Each aligner is configured to provide a semi-confined open space for receiving one of the two shelve with a no-contact clearance gap between them.

As used herein, the phrase like "aligner", "frame", "shelf" refers to mechanical piece parts that have certain irregular shapes. Different sections of the irregular shapes respectively and cohesively are designed to serve different aspect of functions such as supporting, guiding, adjusting, limiting an optical component to align with another optical component. For example, the aligner may be made by molded plastic, or die-cast, machined, or a stamped sheet metal part. The frame may be made by machined nickel-plated copper tungsten, or metal injection molded cooper tungsten, or other strong material to absorb possible high external loads and materials with low coefficient of thermal expansion to match that of the photonic integrated circuit material. The shelf is referred as piece sticking out a wall (or something with a vertical side edge) and herein is a structure extended out of a side edge from a bottom of a package structure of a circuit chip. One preferred material may be glass, the same material for the connector body seated above for achieve secure and reliable optical alignment.

Figure 2:
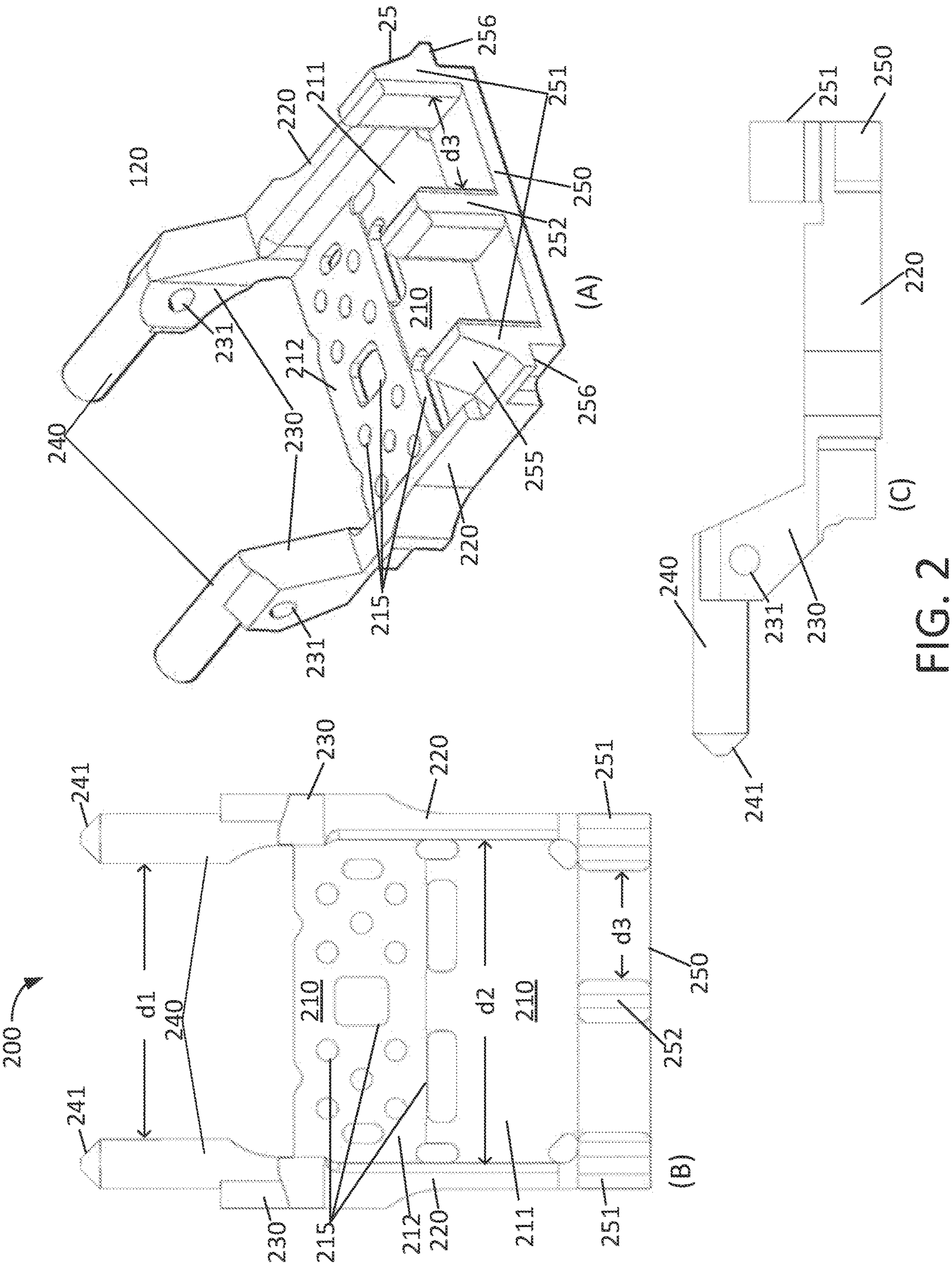
FIG. 2 is a perspective view, top view, and side view of a frame for supporting optical aligners to secure optical alignments of a FAU connector with a PIC chip according to an embodiment of the subject technology.

FIG. 2 is a perspective view, top view, and side view of a frame for supporting optical aligners to secure optical alignments of a FAU connector with a PIC chip according to an embodiment of the subject technology. In an embodiment, the frame 200 is provided as a single piece part made by solid material with multiple functional sections to at least provide support surfaces for optical aligners with alignment features to plug-in FAU connectors aligned with lenses of the PIC chip. In the perspective view (part A) of the figure, the frame 200 includes a bottom section 210 have a first support surface 211 joined with a second support surface 212. The bottom section 210 also is configured to have multiple through-holes 215 within both the first support surface 211 and the second support surface 212. These through-holes are made for facilitating epoxy dispense and bonding inspection from underside of the frame 200. The bottom section 210 has its two sides joined respectively to a pair of side sections 220. The bottom section 210 to the front ends at a front edge of the second support surface 212 and to the back ends a rear end of the first support surface which is joined with a rear section 250 of the frame 200. The frame 200 further includes two shoulder sections 230 having their lower ends respectively joined with the pair of side portions 220 and extended upward with their upper ends respectively joined with a pair of arm sections 240 extended further forward in parallel to the pair of side sections 220. In an embodiment, the pair of arm sections 240 is configured to insert into the package structure 12 of the PIC chip (see FIG. 1). The two shoulder sections 230 also include two holes 231, which are designed for inserting a pivotal pin to support a lid 300 (not shown here). The rear section 250 includes three pillars, two outer pillars 251 joined respectively to the pair of side sections 220 and one central pillar 252 located at midpoint of the rear end 250 and joined with the rear end of the first support surface 211. The outer pillar 251 has a sloped side wall 255 down to an inward step 256. This shaping configuration of the sloped side and inward step is configured to form a latch locking the lid 300 (see FIG. 1). The central pillar 252 has two side walls in straight shape. The three pillars structure of the rear section 250 creates two channels (with a spacing of d3) between the central pillar 252 and either one of the two outer pillars 251, which provides a pathway for ribbon fibers of the FAU connectors (see FIG. 1).

In an embodiment shown in part B of the figure, a top view of the frame 200 illustrates a spacing d1 between the pair of arm sections 240. The two arm sections 240 each has a taper end 241 designed for facilitating the attachment of the frame 200 to the package structure 12. The spacing d1 is roughly the nominal spacing d2 between the two side sections, which is designed to allow two optical aligners 100 to be placed in the frame 200 (see FIG. 1). Each of the two aligners 100 is designed to provide a semi-confined open space to receive a shelf 13 that is extended out of the side edge of the PIC chip. Thus, two shelve 13 can be contained inside the two aligners 100 placed in the frame 200. The two aligners 100 are configured to have their bottom be supported (to be bonded by epoxy) by the first support surface 211. The two shelve 13 are configured to be supported (to be bonded by epoxy) by the second support surface 212. The epoxy can be dispensed from underside of the frame 200 and cured after loading the FAU connectors and the optical alignment between a lens of each FAU connector and a lens at the side edge of the PIC chip.

In an embodiment shown in part C of the figure, the side view of the frame 200 also shows a taper end 241 for each arm section 240 for inserting in the package structure of the PIC chip. The shoulder section 230 is seen connecting the arm section 240 at upper end in a roughly 45-degree angle with the side section 220 at lower end. When the arm section 240 is inserted horizontally into the package structure, the side section 220 (together with the bottom section, which is not seen in the side view) will be also in horizontal direction to keep the support surfaces flat.

Figure 3:
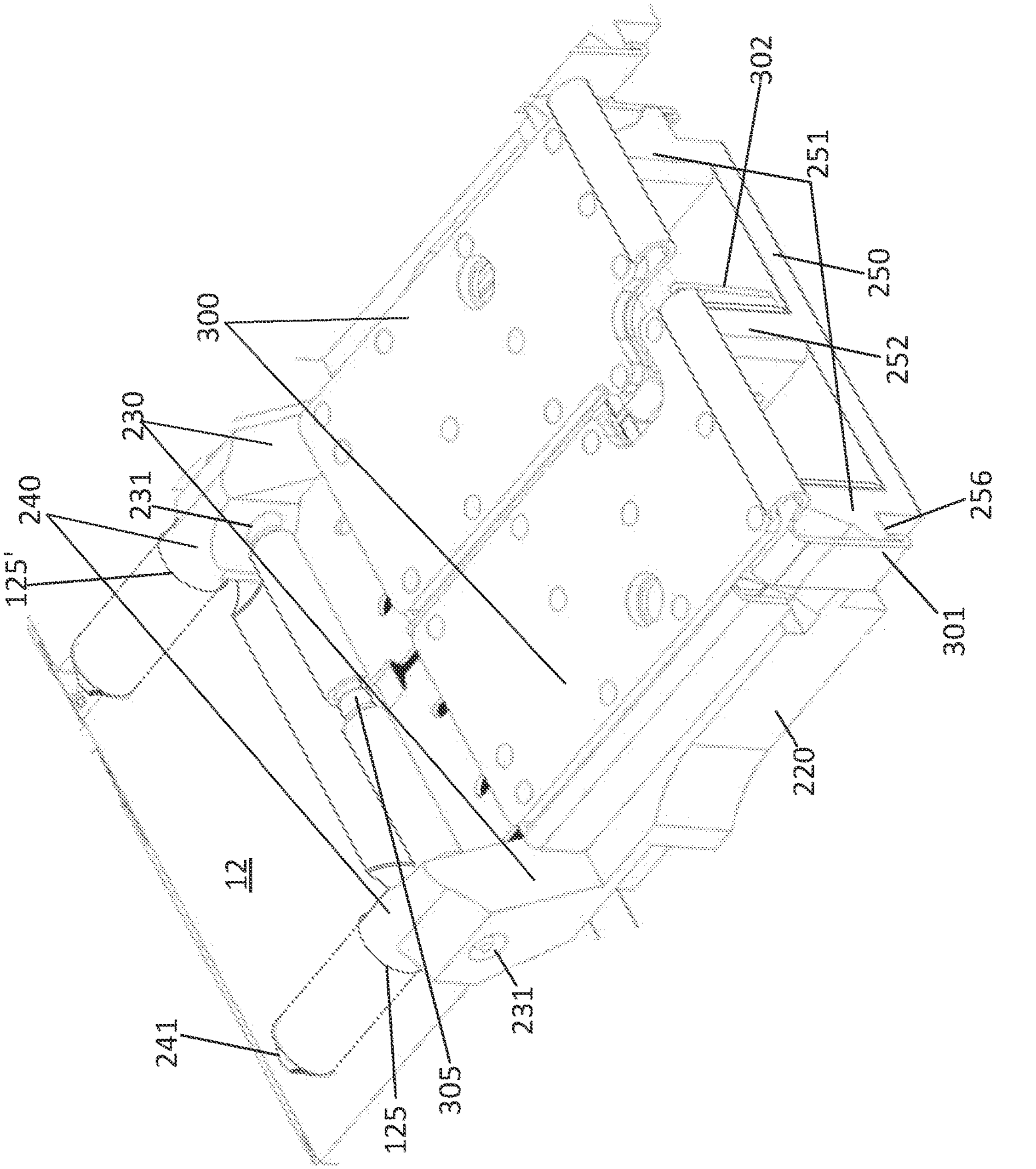
FIG. 3 is a perspective view of a frame inserted in a package structure of the PIC chip coupled with two lids in closed position according to an embodiment of the subject technology.

FIG. 3 is a perspective view of a frame inserted in a package structure of the PIC chip coupled with two lids in closed position according to an embodiment of the subject technology. In an embodiment, FIG. 3 shows that the two arm sections 240 are respectively inserted into two holes 125 and 125' in the package structure 12 (partially shown). The two arm sections 240 have nominal cylinder shapes while the two holes 125 and 125' have nominal circular shapes. In a specific embodiment, one of the two holes 125 may have purposely made in slightly different shapes from another hole 125'. The taper end 241 allows the insertion operation relatively easier. The hole insertion of the arm sections is only attachment support of the frame, which leads to a floating state for the frame to keep the support surfaces flat in horizontal direction. The floating state of the frame 200 helps to minimize affection of thermal expansion of nearby materials to the aligner 100 and shelf 13 supported (or to be bonded by epoxy) by the frame. FIG. 3 also shows two lids 300 being coupled to the two shoulder sections 230 via a single pivot pin 305 inserted into two holes 231. The pivot pin 305 allows the lid 300 can rotate from a closed position (currently shown in FIG. 3 with topside visible) to an upright open position (see FIG. 1) that allows the placement of two aligners 100 into each frame 200. The lid 300 includes a first piece plate 301 formed at a side of the lid 300 and a second piece plate 302 at another side of the lid 300. As shown in FIG. 3, the first piece plate 301 has a hooked end configured to be matched by the inward step 256 on the outer pillar 251 when the lid 200 is in closed position. The second piece plate 302 has a straight shape to slide down the straight side of the central pillar 252. Both lids are configured in mirror symmetry fashion except that the straight piece plate 302 is relatively shifted to clip with the central pillar 252 at its opposite sides.

Figure 4:
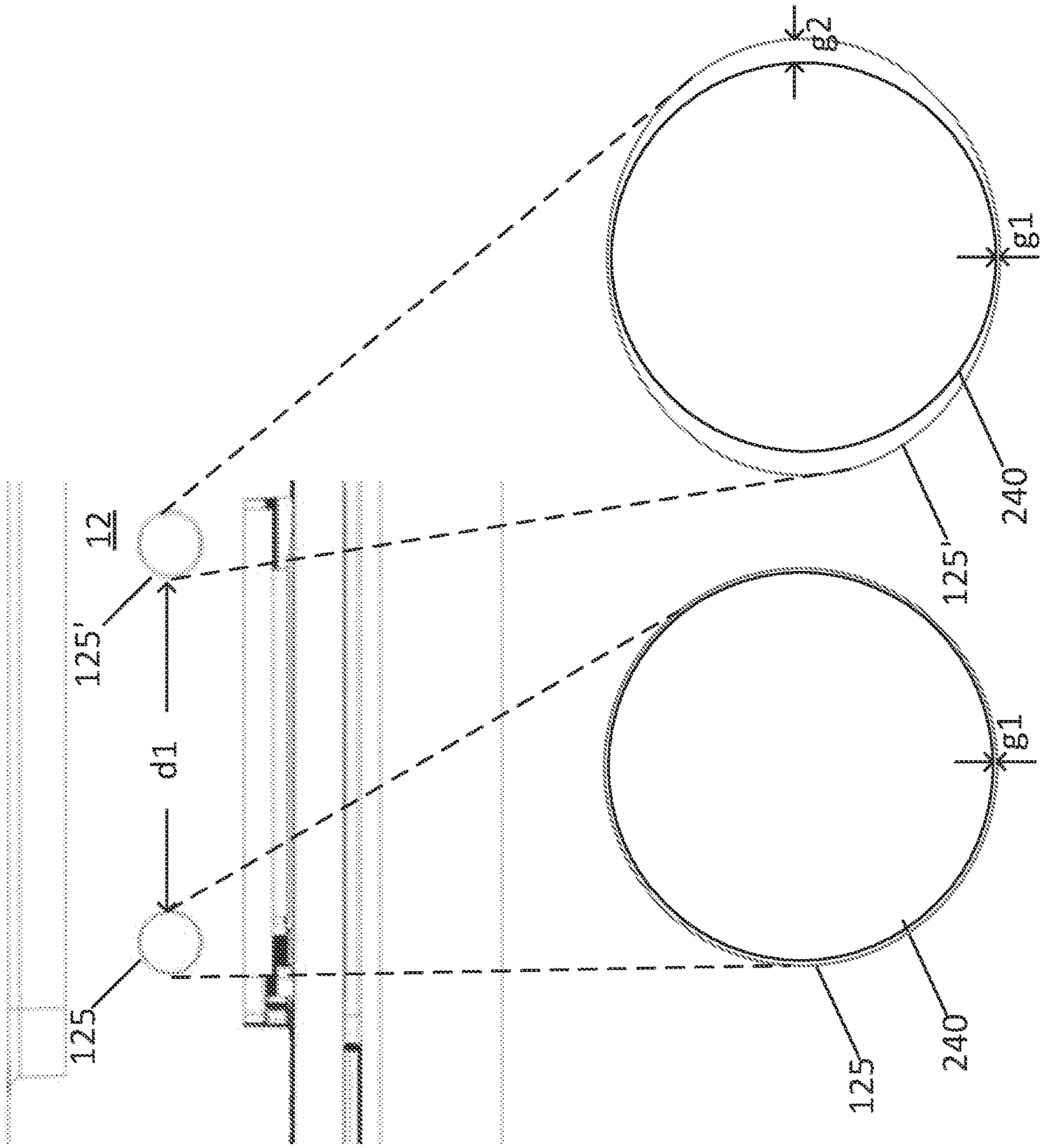
FIG. 4 is a cross-sectional view of the two holes in the package structure of the PIC chip and enlarged view of showing specific shape of the two holes according to an embodiment of the subject technology.

FIG. 4 is a cross-sectional view of the two holes in the package structure of the PIC chip and enlarged view of showing specific shape of the two holes according to an embodiment of the subject technology. In an embodiment, FIG. 4 shows further detail configuration of the attachment of the arm section with the corresponding hole in the package structure 12 of the PIC chip. As shown, a cross-sectional view of the two holes in nominal circular shape with a spacing d1 and two arm sections 240 in cylinder shape are fitted in respectively. In the enlarged view, the hole 125 is made to be a circular shape, so is the corresponding arm section 240 except than the diameter for the hole is slightly bigger than that of the arm section 240 by a small gap g1 all-around the arm section. In an embodiment, the gap g1 allows the arm section 240 to be freely inserted in or retrieve back, yet it is limited to a small spacing, e.g., nominal 30 μm to minimize its motion (both letteral and vertical) inside the hole 125 with tight X/Y alignment. While the other hole 125' of the two is configured to be an ellipse shape to give the other arm section 240 in the same cylinder shape inside the hole 125' with a larger gap g2 in horizontal direction yet a same gap g1 in vertical direction. This is to allow some margins for easier manufacturing the holes as well as the arm sections of the frame. At the same time, the ellipse shape of the hole limits the rotation of the frame after the arm section is inserted in the hole. A larger lateral gap, e.g., 120 μm, permits extra freedom for the two arm sections to find their respective holes to complete the attachment. Yet the same tight vertical gap (e.g., 30 μm or smaller) still provides desired limitation to restrict vertical swing of the frame, keeping the floating state of the frame and corresponding support surfaces in horizontal direction.

Figure 5:
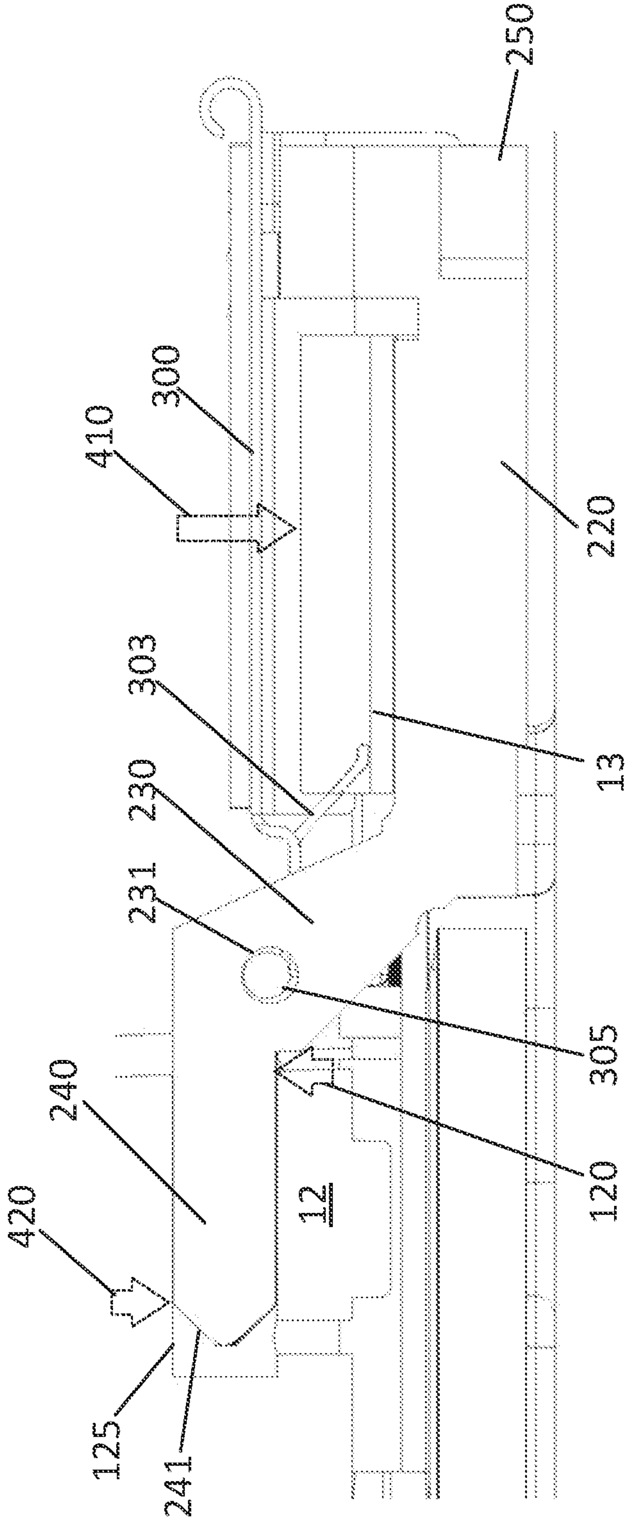
FIG. 5 is a side view of the frame inserted in the package structure with an illustration of the floating state of the frame according to an embodiment of the subject technology.

FIG. 5 is a side view of the frame inserted in the package structure with an illustration of the floating state of the frame according to an embodiment of the subject technology. The frame in a floating state attached to the package structure 12 is further showed in detail. The arm section 240 with the taper end 241 has been inserted into the hole 125 in a horizontal direction, leaving the side section 220, which is in parallel to the arm section 240, also in horizontal direction. In this configuration, the arm section 240 has at least a contact position 120 at a bottom of entrance of the hole 125 though there may be multiple contact points along the arm-length as the gap g1 between the hole 125 and the outer body of the cylinder-shaped arm section 240 is very tight (smaller than 30 μm). When there is any force 410 (minimum the weight of the frame itself) pressed down on the rear section 250 of the frame or on the shelf 13 (by loading FAU connector on it) supported by the frame, this force 410 will be balanced by a reaction force from the package structure 12 at a touch point 420 near the front end of the arm section 240. The contact position 120 serves as a pivot point for such balance of the frame. There is no other direct contact between the frame and the package structure 12 other than the pivot point 120 and the reaction force point 420, implying that the associated support surfaces provided by the frame are maintained in the floating state to support the aligner and shelf.

Referring to FIG. 5, it also illustrates the side view of the lid 300 being in a closed position on top of the frame. The lid 300 is coupled with the frame via the pivot cylinder pin 305 inserted in the holes 231 in two shoulder sections 230 (see FIG. 3). Optionally, as shown in FIG. 3, two lids 300 are coupled via a single pivot cylinder pin 305 inserted to the respective holes in two shoulder sections 230 of each frame 200. One piece plate 303 is attached to underside of the lid 300 in a downward angle such that when the lid 300 is turned to the closed position, this piece plate 303 would touch the top surface of a body of a FAU connector 14 (see FIG. 1) loaded via the aligner 100 on the shelf 13 and apply a force to hold the FAU connector 14 in its alignment position on the shelf (which is supported by the frame 200).

Figure 6:
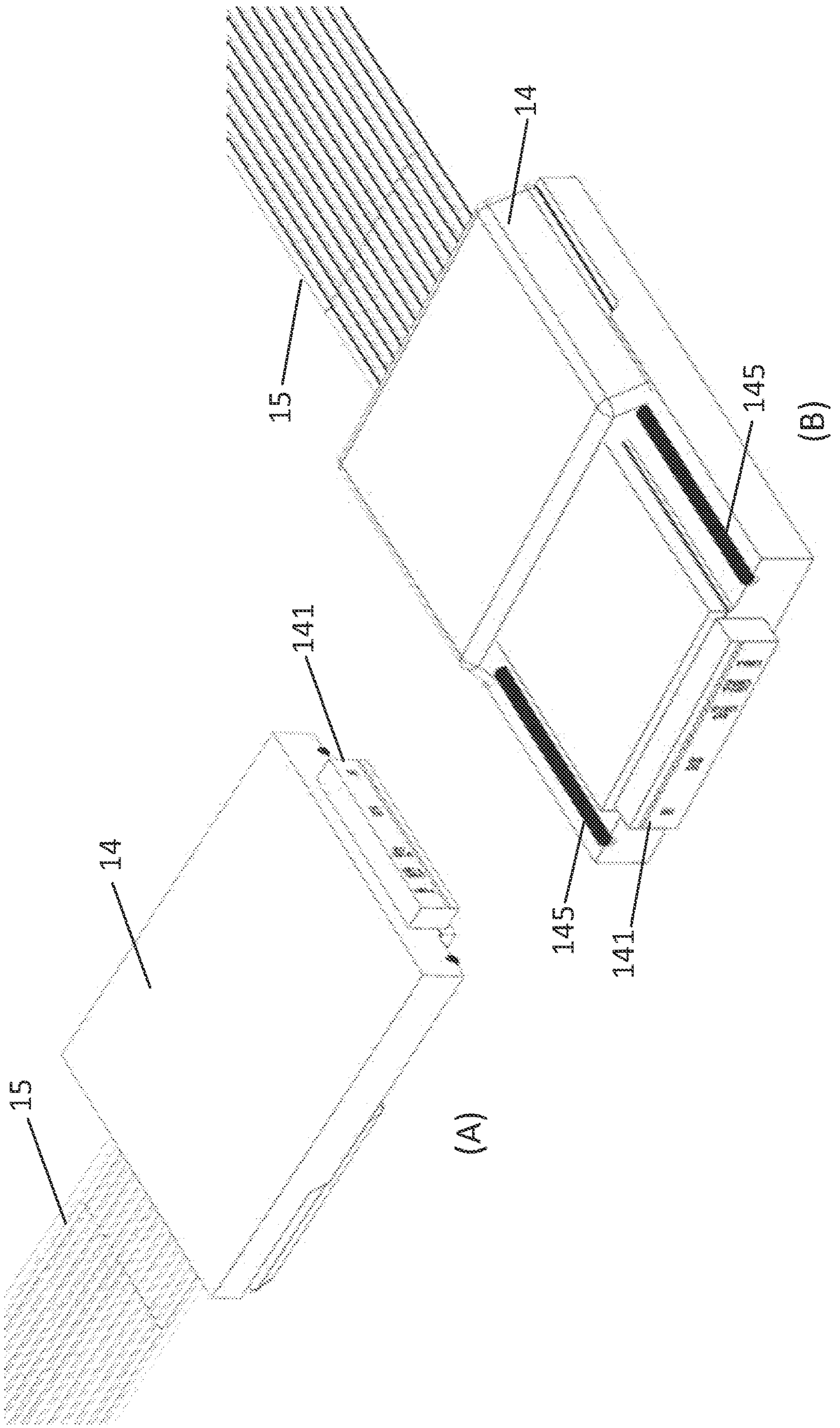
FIG. 6 is a perspective view of both top and bottom of a body of FAU connector with alignment rods according to an embodiment of the subject technology.

In a general aspect of the subject technology, the frame 200 as disclosed here throughout the specification is to provide a support to alignment structure that assists an alignment between a lens of FAU connector with a corresponding lens of the PIC chip. FIG. 6 shows a perspective view of the body of the FAU connector that is used to align with the PIC chip to establish optical IOs via the aligner 100 placed in the frame 200. Part A of FIG. 6 shows the top surface of the body of FAU connector 14 with one side being attached with a lens 141 (may include an array of micro-lenses) and another side being coupled to the ribbon fiber 15. Part B of FIG. 6 shows an alignment feature, two alignment rods 145 attached to respective V-grooves located in bottom surface near and in parallel to two sides of the body 14, associated with the present subject technology. As the body of FAU connector 14 is loaded, the aligner 100 is configured to guide the FAU connector 14 down to a top surface of the shelf (13). The top surface of the shelf (13) also includes two V-groves configured to receive the two alignment rods. These V-grooves are alignment feature prebuilt in the shelf and the shelf, which is extended beyond respective side edge of the PIC chip (see FIG. 1) from a package structure below the PIC chip, is pre-aligned to the lens of optical IOs at the side edges of the PIC chip.

Figure 7:
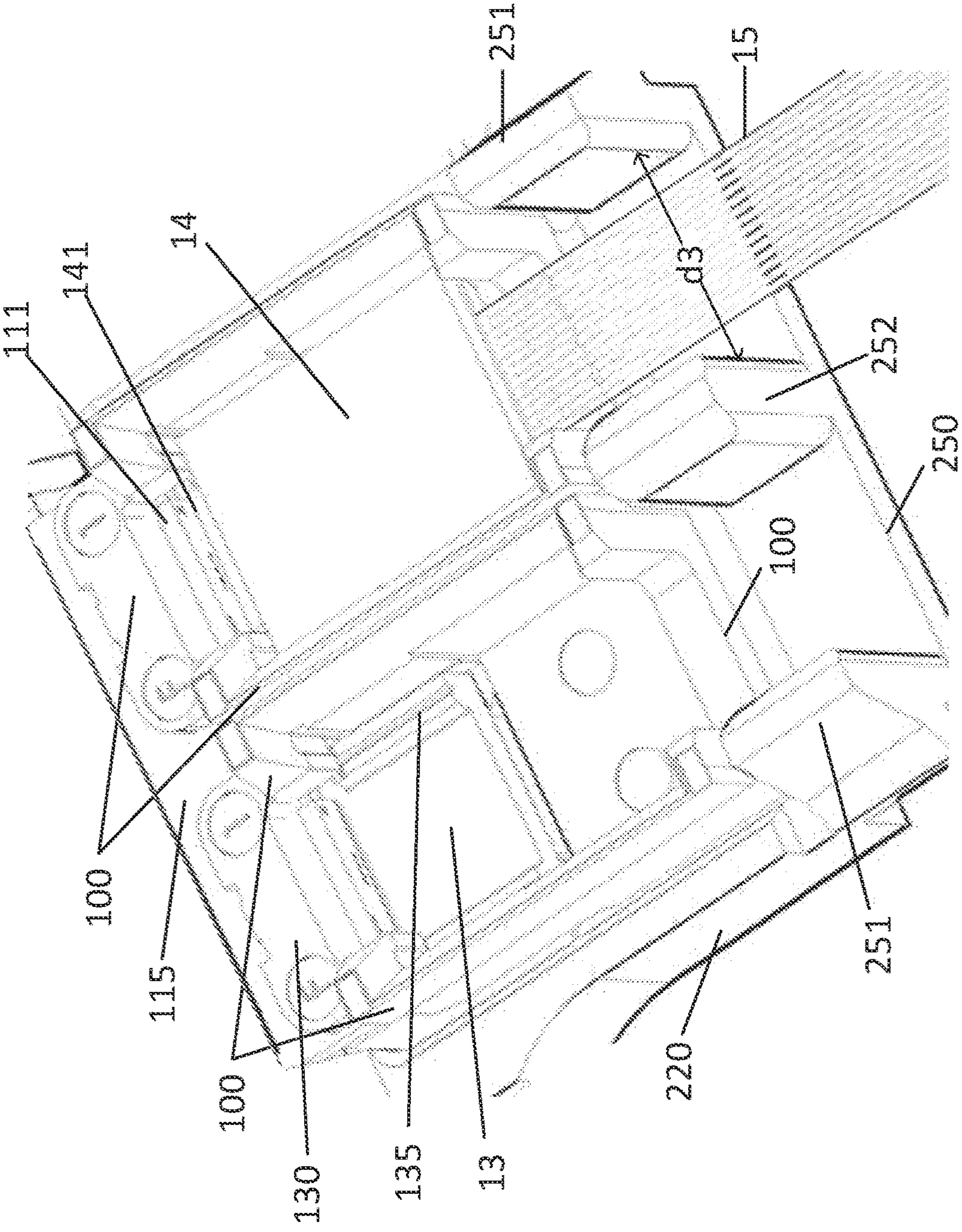
FIG. 7 is a perspective view of a configuration with an aligner being placed in the frame receiving a shelf extended from the PIC chip within the semi-confined open space and a same configuration next to it but with a FAU connector being loaded on the shelf according to an embodiment of the subject technology.

FIG. 7 is a perspective view of a configuration with an aligner being positioned and receiving a shelf 13 extended from the PIC chip within the semi-confined open space and a same configuration next to it but with a FAU connector 14 being placed on the shelf 13 through a same aligner according to an embodiment of the subject technology. In an embodiment, the aligner is a piece part of an optical connector for a photonic integrated circuit (PIC) chip, for example, a silicon photonics-based ICs with optical inputs/outputs co-packaged with electronical switch ICs. As shown, the aligner 100 is disposed pair wisely in a frame 200 located in a position designated for optical IOs at a side edge of the PIC chip. As each of the pair of aligners 100 is disposed in the frame 200, the aligner 100 has a support bar 130 positioned on a surface 115 near the side edge of the PIC chip to keep the aligner 100 in a leveled state. At the same time, a shelf 13, which is extended out from the side edge of the PIC chip, is fully received in the semi-confined open space provided by one of the pair of aligners 100. The aligner 100 is in a proper position relative to the frame 200, a position designed for guiding a body of FAU connector 14 down to the shelf 13. The shelf 13 comprises a pair of V-grooves 135 (only one is visible in this perspective view) formed in surfaces along two sides of the shelf. In an embodiment, the shelf 13 is configured to be used as a support for a body of FAU connector 14 loaded from top as illustrated in neighboring one of the pair of aligners 100. The V-grooves 135 in the shelf 13 are configured to receive alignment rods (denoted as 145 in FIG. 6) on the body of FAU connector 14 to ensure the body of FAU connector 14 being plugged in an alignment position such that the lens 141 of the FAU connector 14 optically aligns with the lens 111 at the side edge of the PIC chip.

In an embodiment, the aligner 100 is placed in the frame 200 in the proper position such that the shelf 13 is fully received into the aligner with an all-around clearance gap without direct touching each other. This is to ensure no affection to sensitive optical alignments involving the shelf 13 from thermal expansion/contraction of the aligner 100. Optionally, the aligner 100 may be glued by epoxy to a bottom surface of the frame structure 200 to secure this proper position, while the frame 200 is configured to attach in a floating state with the strong package structure 12 of the CPO-PIC assembly (see FIG. 1 and FIG. 5). In another embodiment, once the optical alignment is achieved after the body of FAU connector 14 being loaded down to the shelf 13, the bottom of the shelf 13 can be glued to a bottom surface of the frame structure 200 by dispensing epoxy through multiple through-holes at the bottom section 210 from underside of the frame 200.

Figure 8:
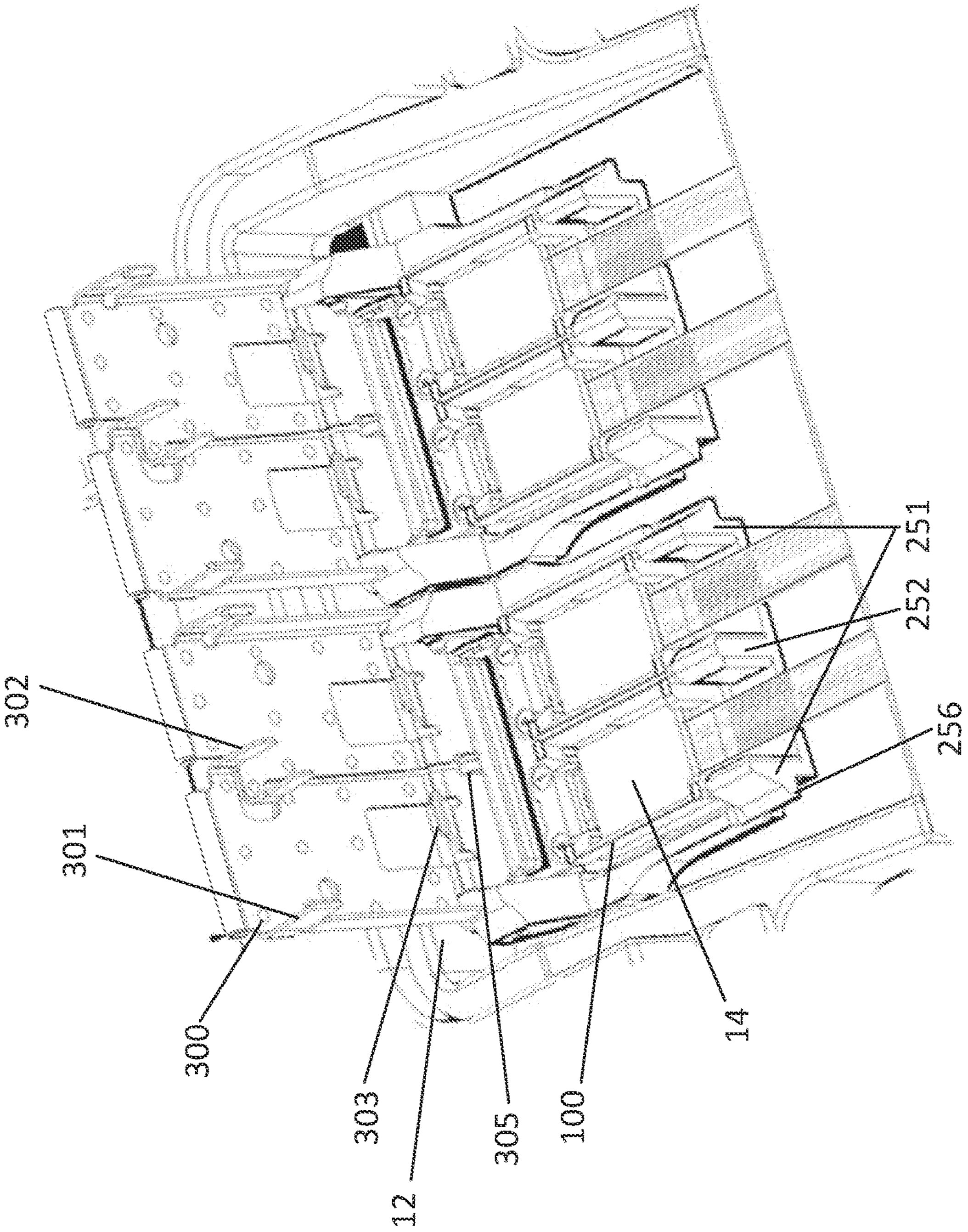
FIG. 8 is a perspective view showing bodies of four (two pairs) of FAU connectors being loaded onto the shelve in the semi-confined open space provided by respective aligners supported by two (one pair) of frames with lids in opened positions according to an embodiment of the subject technology.

In yet another embodiment, the alignment structure of the subject technology, referred as the aligner 100, is placed into a designated position defined by a frame 200 based on the location of the optical IOs at the side edge of the PIC chip. In a specific embodiment, as shown in FIG. 8, for every one frame 200, it provides two positions for placing two aligners 100 one next to another. Each of the two positions are directly associated with the location of the lens of the PIC chip at the side edge. A shelf with corresponding alignment feature associated with this lens is attached to underside of the package structure of the PIC chip and extended out of the side edge. The frame 200 is attached to the package structure 12 designed for packaging the CPO-PIC assembly (see FIG. 1) along the side edge of the PIC chip so that two shelve are included in the frame 200. Each of the two aligners 100 then is placed to corresponding one of the two positions to receive the corresponding one of the two shelve. Each aligner 100 further provides a guide for loading one FAU connector 14 (as shown in FIG. 6) onto the shelf to achieve alignment between a lens of the FAU connector and corresponding lens of the PIC chip for forming one optical IO of the CPO-PIC assembly.

Figure 9:
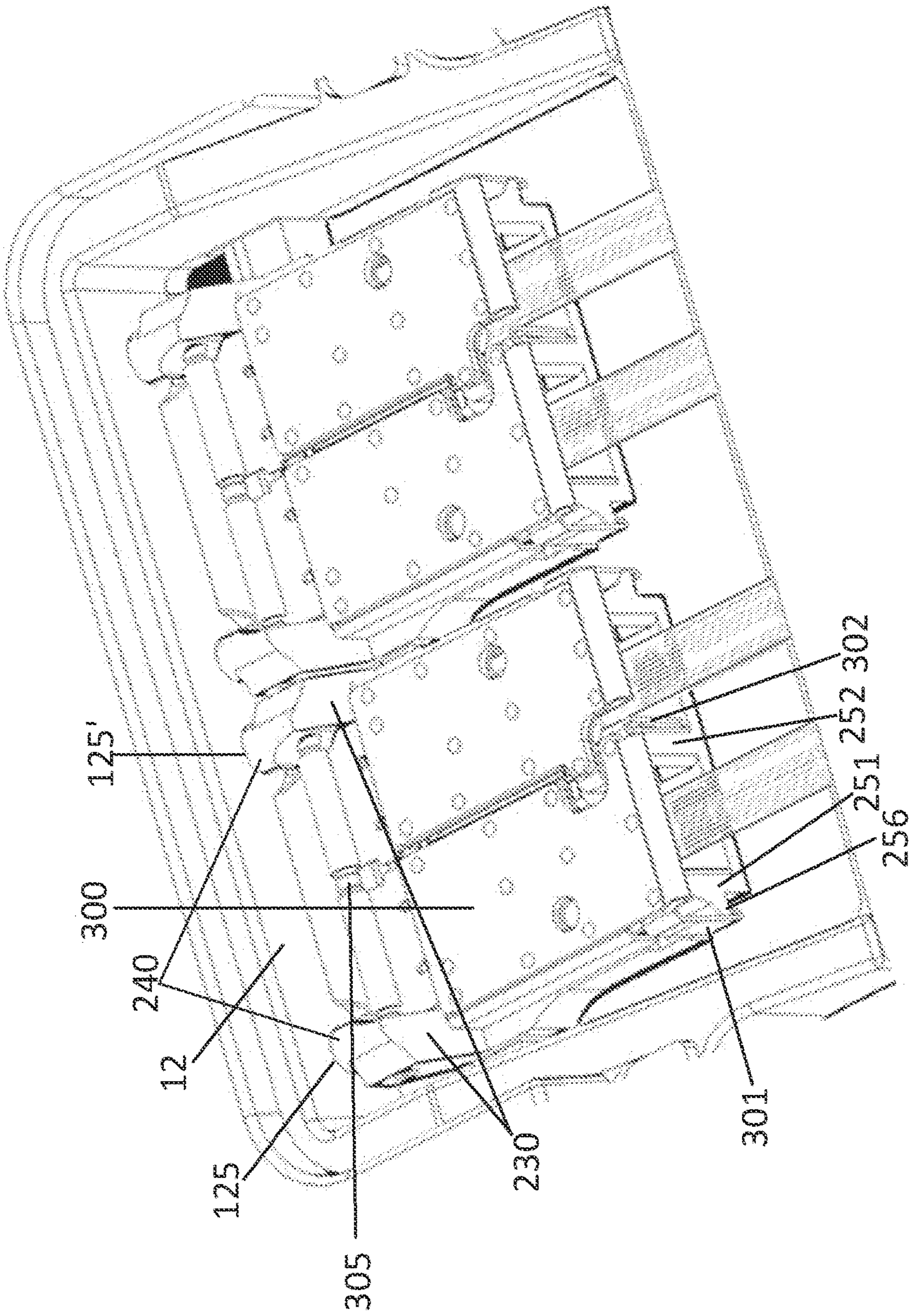
FIG. 9 is a perspective view showing bodies of four (two pairs) of FAU connectors on the respective shelve with lids in closed positions according to an embodiment of the subject technology.

In still another embodiment, FIG. 8 also shows that the formation of optical IO of the CPO-PIC assembly involves another feature piece part, a lid 300 for covering each aligner 100 in the designated position with a body of FAU connector 14 being loaded. As shown in FIG. 8, the lid 300 is coupled to the frame 200 via one pivotal pin 305, which allows the lid 300 to open to an upright position or close to a flat position over the aligner 100 and the body of FAU connector 14 loaded inside the semi-confined open space of the aligner. FIG. 8 shows an opened position of the lid 300, revealing a piece plate 303 connected to the bottom surface of the lid 300 in an angle tilted downward (but)<90° (see FIG. 5). Further, the lid 300 is configured to have two additional piece plates 301 and 302 connected in 90° to two side edges of the lid 300. One piece 302 is straight in shape for sliding down along a straight side wall of a central pillar 252 on the frame 200 when the lid 300 is turned to the closed state. Another piece plate 301 has a hooked end for latching with an inward step 256 of an outer pillar 251 on the frame 200 when the lid 300 is in the closed state. This is shown in FIG. 9 when the lid 300 is turned via the pivotal pin 305 from the open position to the closed position to cover the aligner 100 and the angled piece plate 303 can be configured to press on top of the body of FAU connector 14 (see FIG. 5) with a spring force to secure the alignment position of the FAU connector aligned with the lens of the PIC chip.

Figure 10:
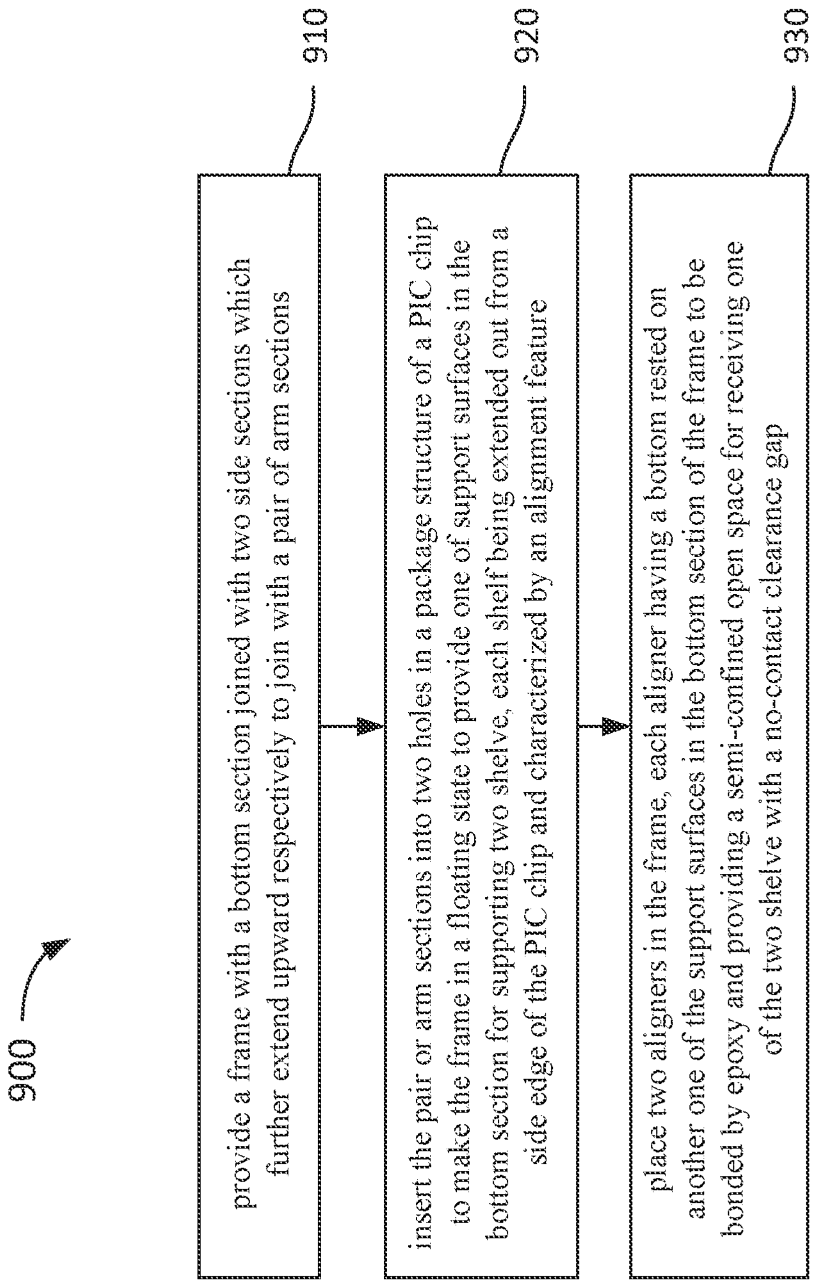
FIG. 10 is a flow chart showing a method for supporting alignment between FAU connectors and a PIC chip according to another embodiment of the subject technology.

In an alternative aspect, the subject technology provides a method for supporting alignment for optical inputs/outputs (IOs) of a co-packaged optics-photonic integrated circuit (CPO-PIC) assembly. FIG. 10 shows a flow chart illustrating method 900 for supporting alignment of a fiber array unit (FAU) connector with a photonic integrated circuit (PIC) in an embodiment of the subject technology. The method 900 includes a step 910 for providing a frame having a bottom section joined with two side sections which further extend upward respectively to join with a pair of arm sections. The frame is an irregular shaped single piece part made up with multiple sections. Each section serves its function to collectively provide support surfaces for supporting other piece parts to assist the formation of optical inputs/outputs (IOs) and optical alignments in the CPO-PIC assembly. For example, a silicon-based photonic integrated optical transceiver co-packaged with electrical switch module in the CPO-PIC assembly needs optical IOs that involve placement of miniature optical connectors with secured optical alignment. FAU connectors are used to form such optical IOs by coupling lenses of FAU connectors with lenses at side edges of the PIC chip. In a specific embodiment, the frame is configured to provide a first support surface for an aligner to be bonded to and a second support surface for a shelf to be bonded to. The aligner is configured to guide a body of FAU connector from top onto the shelf and find an alignment position there to achieve alignment between a lens of the FAU connector and the corresponding lens of the PIC chip.

In an embodiment, method 900 also includes a step 920 for inserting the pair or arm sections into two holes in a package structure of a PIC chip to make the frame in a floating state to provide one of support surfaces in the bottom section for supporting two shelve. In an embodiment, the arm sections, which are the part extended to very front of the frame, are only part of the frame that is directly attached to the package structure. The two holes in the package structure are designed to fit in the pair of arm sections in cylinder shape with restriction to its rotation and vertical motion but leaving a small amount of horizontal shift freedom in just one hole for facilitating the installation process. The arm sections are also in parallel to the side section as well as the bottom surface so that the frame is attached in the floating state to keep the support surfaces provided in the bottom section remained in a horizontal direction. In an embodiment, the frame is configured to have one support surface to support two shelve pair wisely located at the side edge of the PIC chip. Each shelf is a piece part having an alignment feature associated with a lens of the PIC chip at side edge. Optionally, the shelf is attached to a part of underside package structure of the PIC chip and extended out a small length beyond the lens at the side edge of the PIC chip.

FIG. 10 also shows that method 900 includes a step 930 for placing two aligners in the frame. In an embodiment, each aligner is made of a front section and a bottom section respectively joined with two side sections spaced apart by a first distance to provide a semi-confined open space. The semi-confined open space further includes a cutout space from a part of the bottom section and a part of the front section. The cutout space receives the shelf of the PIC chip as the aligner is disposed in the frame with the front section of the aligner positioned on a surface of the PIC chip and the bottom section supported by one of the support surfaces of the frame. In an embodiment, the aligner is placed in such a way to have a no-contact clearance gap between the aligner and the shelf received inside the cutout space. In an embodiment, the bottom section of the aligner is configured to be bonded by epoxy on the one of support surfaces of the frame. In an embodiment, the aligner is placed into the frame manually by an operator or assembling worker into a position supported by the frame. At this position, the aligner can be used for facilitating a placement of a body of FAU connector and allow the lens of FAU connector to align with the lens at the side edge of the PIC chip. The functions and other benefits of the frame have been presented in the previous paragraphs and illustrated from FIG. 1 through FIG. 9.

In another embodiment, method 900 may include a step for using the two aligners in the frame to respectively guide two FAU connectors onto the two shelve in the corresponding semi-confined open space. In an embodiment, the aligner is configured to provide certain functional sections to load the FAU connector. For example, the aligner may include a sloped facet to its side section for facilitating lowering the body of FAU connector from top down to the shelf. The width of the open space is set to be slightly bigger than the width of the body of FAU connector.

In yet another embodiment, method 900 may include a step for adjusting each FAU connector on the shelf based on the alignment feature to achieve alignment between a lens of the FAU connector and a corresponding lens at the side edge of the PIC chip. In an embodiment, the aligner may be configured to provide extra rotational freedom inside the semi-confined open space for facilitating adjustment of the body of FAU connector to find the alignment position based on the alignment feature, for example, by matching two alignment rods with respective v-grooves. The aligner further may be configured to set front L-shaped end-sections to provide hard stops for the body of FAU connector to prevent physical touching of the lens of FAU connector and the lens of PIC chip, instead, to maintain an ideal spacing to maximize optical coupling. Or, the aligner may also be configured to set rear L-shaped end-sections to provide extra translation freedom for adjusting the FAU connector inside the semi-confined open space.

In still another embodiment, method 900 may further include a step for curing the epoxy between each shelf and one of the support surfaces to secure the shelf with the body of the FAU connector above at the alignment position. As in the step 920, once the frame is inserted (its two arm sections) into the package structure of the PIC chip, the shelf will be supported by one of support surfaces provided by the frame. Yet the support is not fixedly bonded, and the support surface is flat and in a floating state. In an embodiment, the bottom section that provides this support surface includes multiple through-holes therein. Using these through-holes, epoxy can be dispensed from underside of the bottom section into the interface, without curing, between the shelf and the support surfaces. Only after the loading of the FAU connector via the aligner onto the shelf and the optical alignment between the FAU connector and PIC chip is reached, step 960 is executed to bond the shelf to the support surface to secure the alignment between the lens of FAU connector and the lens of the PIC chip.

In yet still another embodiment, method 900 may further include a step for curing the epoxy between each aligner and the corresponding one of the support surfaces of the frame to fix a position for the aligner to ensure a no-contact clearance between the body of the FAU connector and the aligner. As the aligner is placed in the frame in the step 930, the aligner provides a semi-confined open space to receive the shelf with a non-contact clearance gap and ready to allow a body of FAU connector to be loaded onto the shelf while the bottom section of the aligner is supported by one of support surfaces of the frame. Yet the support is not fixedly bonded, and the support surface provided by the frame is flat and in a floating state. The aligner serves its function for guiding the body of FAU connector into the semi-confined open space and finding its alignment position on the shelf. Once this alignment position is reached, the shelf can be firstly fixed on the frame by curing the epoxy between them. Then the aligner can be fixed by curing the epoxy in the interface between the support surface and aligner's bottom to secure the support position of the aligner on the support surface of the frame. This position would correspond to an ideal position to keep the non-contact clearance gap between the aligner and the shelf as well as the body of FAU connector seated above the shelf. Again, the epoxy can be pre-dispensed through the multiple through-holes into the interface between the bottom section of the aligner and the support surface of the frame. Stress measurements indicate that there is almost no stress shown in the optical IOs involving these piece parts like the frame, aligner, and shelf based on the present disclosure subjected to temperature changes from 150° C. cooled to 80° C.

In some embodiments, method 900 includes placing the two aligners with the same structure into the frame in a side-by-side configuration. Both aligners are to be bonded by epoxy onto one of support surfaces of the frame to secure respective positions with a no-contact clearance gap from a respective pair of shelve.

In another embodiment, the frame can be associated with a lid coupled to the two shoulder sections. Optionally, there are two lids one sided with another commonly coupled with the two shoulder sections via a single pivot pin. Method 900 may include opening the two lids to an upright position to make the bottom section of the frame available to place two aligners. Additionally, method 900 may include closing the two lids to a flat position to use a piece plate with hooked end at one side of each lid to latch with an inward step at outer side of an outer pillar, locking the lid to the closed position. Method 900 may further include using an angled piece plate attached to the underside of the lid to apply a force for holding the FAU connector on the shelf in alignment with the PIC chip.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A structure for supporting optical alignment pieces comprising:

a frame comprising multiple sections joined together to provide a first support surface for an aligner to be bonded to and a second support surface for a shelf to be bonded to, the aligner being configured to provide a semi-confined open space for receiving the shelf that comprises an alignment feature associated with a second optical component, and to guide a body of a first optical component from top onto the shelf to align with the second optical component via the alignment feature, the multiple sections comprising:

a bottom section providing the first support surface with a front edge and the second support surface with a rear end;

a pair of side sections spaced apart and respectively joined with two sides of the bottom section from the front edge to the rear end;

two shoulder sections respectively having lower ends joined with the pair of side sections at the front edge in an upward angle; and a pair of arm sections respectively joined with upper ends of the two shoulder sections to extend an arm length forward in parallel with the pair of side sections, the pair of arm sections being configured to horizontally insert into a package structure of the second optical component to make the frame in a floating state.

2. The structure of claim 1, wherein the pair of arm sections comprises cylinder shape with a taper end for facilitating the inserting respectively into two holes in the package structure of the second optical component.

3. The structure of claim 2, wherein the pair of arm sections is configured to have one arm section fitted in one of the two holes in circular shape with an all-around gap smaller than 30 μm and have another arm section at the same time fitted in another one of the two holes in elliptical shape with a vertical gap smaller than 30 μm and a horizontal gap smaller than 120 um.

4. The structure of claim 2, wherein the two holes are spaced apart by a distance corresponding to a nominal spacing between the pair of the side sections that is configured to allow placements of two aligners in the frame respectively receiving two shelve associated with two second optical components.

5. The structure of claim 1, further comprising two lids coupled to the frame via one pivotal pin inserted to two holes in respective two shoulder sections, each lid being configured to be independently opened in an upright position revealing the aligner placed in the frame or closed down in a flat position covering the aligner.

6. The structure of claim 5, wherein the frame further comprises a rear section comprising two outer pillars respectively joined with the pair of side sections and a central pillar joined with the bottom section at middle point of the rear end of the first support surface, each of the two outer pillars having a sloped outer side wall with an inward step configured to form a latch for locking respective one of the two lids at a flat closed position.

7. The structure of claim 6, wherein the rear section is configured to provide two open channels between the central pillar and the two outer pillars for passing ribbon fibers respectively associated with two first optical components and a vertical gap between each of the two lids in the flat closed position and each pillar.

8. The structure of claim 7, wherein the vertical gap is configured to limit the lid to over-travel 0.5 mm for unlocking from the flat closed position, wherein the lid comprises a piece plate attached to underside of the lid in a tilted downward angle, the piece plate applying a limited force on the body of the first optical component to secure optical alignment when the lid is locked in the flat closed position.

9. The structure of claim 6, wherein the pair of arm sections are characterized by a stiffness of supporting a force of at least 100 Newton applied to the rear section of the frame.

10. The structure of claim 4, wherein the bottom section comprises multiple through-holes configured to dispense epoxy from underside of the frame to areas between the two aligners and the first support surface and between the two shelve and the second support surface.

* * * * *